(No Model.)

W. A. HARDIN.
TONGS FOR LIFTING SPOOLS OF FENCE WIRE.

No. 296,559. Patented Apr. 8, 1884.

WITNESSES:
W. W. Hollingsworth
A. G. Lyne

INVENTOR:
W. A. Hardin
BY Munn & Co.
ATTORNEYS.

UNITED STATES PATENT OFFICE.

WILLIAM A. HARDIN, OF LEAVENWORTH, KANSAS.

TONGS FOR LIFTING SPOOLS OF FENCE-WIRE.

SPECIFICATION forming part of Letters Patent No. 296,559, dated April 8, 1884.

Application filed February 8, 1884. (No model.)

*To all whom it may concern:*

Be it known that I, WILLIAM ANDERSON HARDIN, of Leavenworth, in the county of Leavenworth and State of Kansas, have invented a new and useful Improvement in Tongs for Lifting Spools of Fence-Wire and other like Objects, of which the following is a full, clear, and exact description, reference being had to the annexed drawings, forming part of this specification.

The invention consists of two bent levers pivoted together and having two of their ends adapted to lie close together, so that they may be inserted into the central opening of a spool or other object having a suitable opening, and then be spread apart to cause them to bind against the surface of the opening by the act of lifting one or both of the other ends of the levers, as hereinafter described and claimed.

Figure 1:
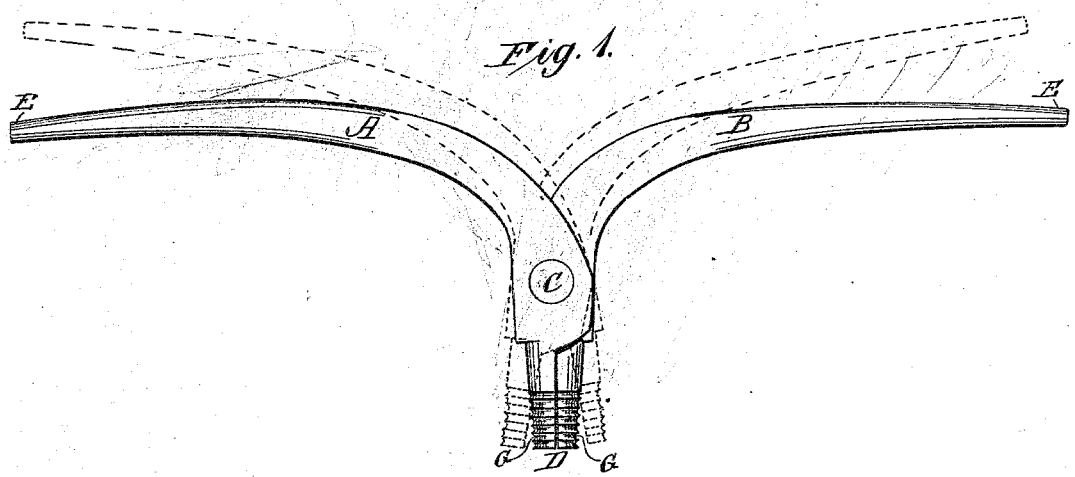
Figure 2:
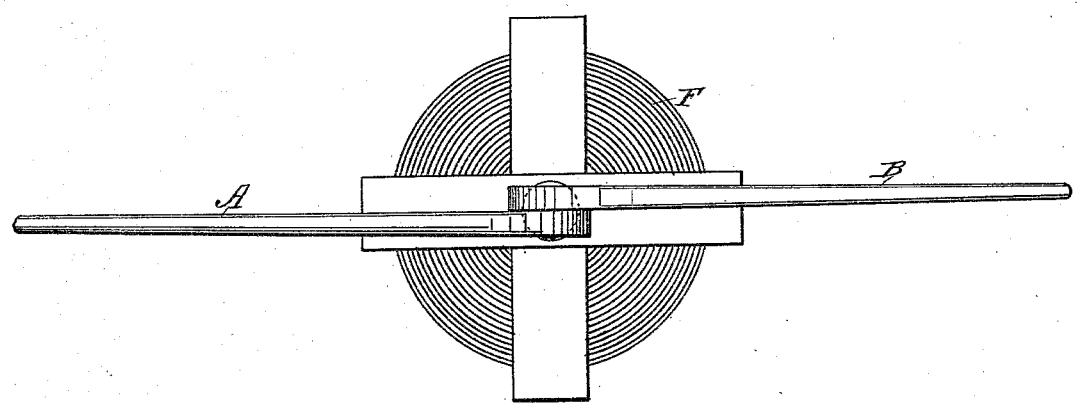

In the drawings, Figure 1 is a side elevation of my improved spool-lifting tongs; and Fig. 2 is a top view of the same, showing it applied to a spool of fence-wire.

A B indicate two bent levers, which are pivoted together at C, and have their ends D adapted to bear against each other when the opposite ends, E, are moved from each other. The ends D are approximately semi-cylindrical, so that when placed together they will form a cylindrical nose, which may be inserted into a round opening in an object to be lifted—such as a spool of wire, F. When the nose is thus inserted into an opening and the ends E of the levers are moved from each other, as in the act of lifting the said ends upward, the ends D will be spread apart in the opening and will bind, so that they will not be withdrawn in lifting. The tongs may be thus attached to an object so that the latter can be conveniently handled.

The nose may be made smooth or provided with corrugations G, to prevent slipping, if desired.

I am aware that it is not broadly new to pivot two levers together as a spool-lifter. Such lifter has heretofore been made, however, with reference to a spool of special form having an internal flange or collar, with which hooks or projections on the levers may engage, and has been provided with shoulders above and below the joint to limit the upward and downward movements of the levers.

My invention is adapted not only to a spool having an internal collar, but to one having a smooth bore or opening without such collar, since the gripping action in my invention is due entirely to the friction against the walls of the opening caused by spreading the nose formed by the short ends of the levers. With such a construction, and by dispensing with the stop-shoulders heretofore used, the tongs may be used on spools having openings of very different diameters.

What I claim is—

The tongs for lifting spools of wire and like objects, consisting of the bent levers A B, pivoted together at C, and having their short ends formed into a nose, D, of approximately cylindrical form, which is adapted to support a spool by frictional contact with the surface of an opening therein, whereby the tongs may be adapted for use on spools of different constructions, and having openings therein of different diameters, substantially as specified.

WILLIAM A. HARDIN.

Witnesses:
JOHN W. PREST,
J. A. REA.